(12) United States Patent
Cardwell et al.

(10) Patent No.: US 11,592,130 B2
(45) Date of Patent: Feb. 28, 2023

(54) SHAPE MEMORY HOSE CONNECTOR

(71) Applicant: Cooper Standard Automotive, Northville, MI (US)

(72) Inventors: Brian Cardwell, Ypsilanti, MI (US); Vasudevan Sooriyamurthy, Chenai (IN)

(73) Assignee: Cooper-Standard Automotive Inc., Northville, MI (US)

( * ) Notice: Subject to any disclaimer, the term of this patent is extended or adjusted under 35 U.S.C. 154(b) by 144 days.

(21) Appl. No.: 17/025,138

(22) Filed: Sep. 18, 2020

(65) Prior Publication Data

US 2022/0090716 A1    Mar. 24, 2022

(51) Int. Cl.
*F16L 33/213*    (2006.01)
*F16L 33/30*    (2006.01)

(52) U.S. Cl.
CPC ............. *F16L 33/213* (2013.01); *F16L 33/30* (2013.01)

(58) Field of Classification Search
CPC ................................ F16L 33/213; F16L 33/30
See application file for complete search history.

(56) References Cited

U.S. PATENT DOCUMENTS

| | | | | |
|---|---|---|---|---|
| 3,767,233 A | * | 10/1973 | Hodge | F16L 33/30 285/239 |
| 4,597,594 A | * | 7/1986 | Kacalieff | F16L 31/00 285/259 |
| 4,635,966 A | | 1/1987 | Hermann | |
| 5,846,247 A | | 12/1998 | Unsworth et al. | |
| 6,053,992 A | | 4/2000 | Wu et al. | |
| 2004/0090064 A1 | * | 5/2004 | Rowley | F16L 13/143 285/179 |
| 2015/0369411 A1 | * | 12/2015 | Kieper | F16L 33/30 285/239 |
| 2017/0191592 A1 | * | 7/2017 | Warren | F16L 33/2071 |
| 2018/0363812 A1 | * | 12/2018 | Fritskey | B23P 15/00 |

FOREIGN PATENT DOCUMENTS

JP    2007154997 A  *  6/2007

* cited by examiner

*Primary Examiner* — James M Hewitt, II
(74) *Attorney, Agent, or Firm* — Paschall & Associates, LLC; James C. Paschall

(57) ABSTRACT

A hose connector for joining flexible hoses is comprised of a tubular pipe body with at least one insertion portions made of a shape memory alloy (SMA) or other shape memory material that has a memorized shape. The insertion portion is located on at least on one end of the tubular pipe body and has an outer diameter smaller than an interior diameter of the flexible hose in a martensite state. The insertion portion is inserted into the interior diameter of the flexible hose and the memorized shape is recovered with the application of heat, wherein the outer diameter of the insertion portion becomes larger than the outer diameter of the flexible hose sealing the outer diameter of the insertion portion against the interior diameter of the flexible hose.

17 Claims, 2 Drawing Sheets

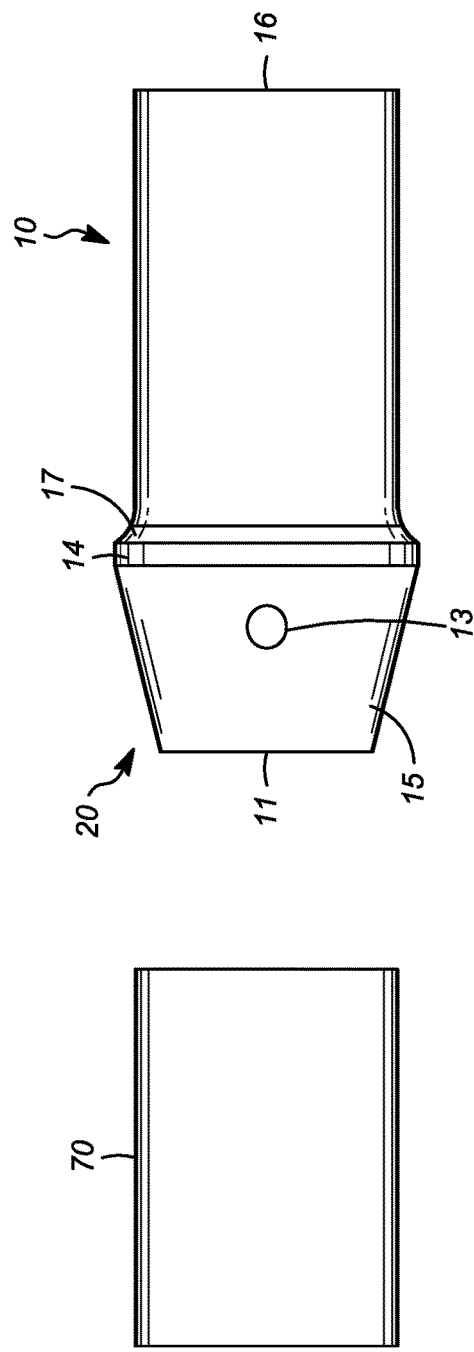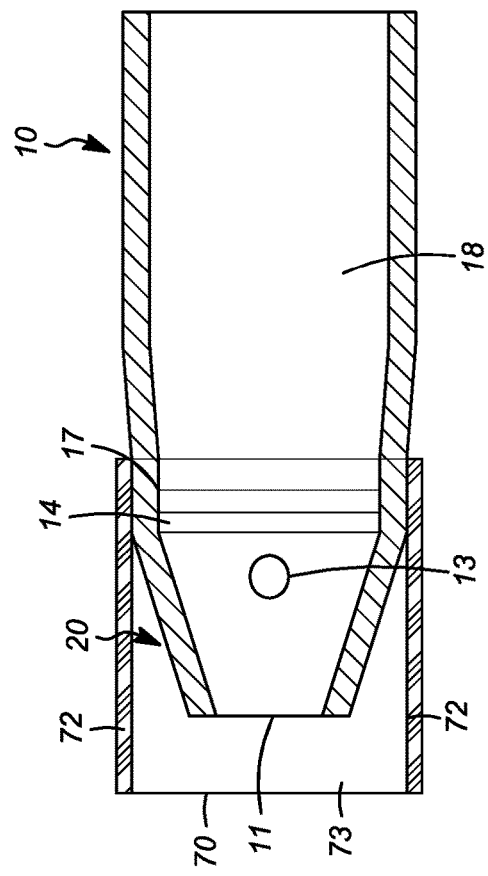

SHAPE MEMORY HOSE CONNECTOR

TECHNICAL FIELD

This disclosure is generally directed to a hose connector adapted to have a flexible polymeric hose fitted on the outer periphery of the hose connector. More specifically, it relates to a hose connector that incorporates shape memory materials to facilitate assembly of the hose connector to a flexible polymeric hose.

BACKGROUND

A hose connector formed at the end of a metal tube is typically used to connect the tubing to a flexible polymeric hose, such as, fuel tubing used between a vehicle's fuel tank and an engines carburetor or other fuel metering system. The fuel tubing can be part of a long rigid fluid line, a stem defined at the end of a connector body or a fitting adapted to connect two flexible hoses together. The polymeric hose is fitted on the outer periphery of the hose connector over radially enlarged frustoconical or barrel shaped protrusions formed on the end the hose connector. For this type of hose connector, a fluid tight seal is maintained by the tightness of the inner walls of the polymeric hose against the protrusions of the hose connector. Therefore, when assembling the polymeric hose on the hose connector considerable force is required to be applied in order fit the hose over the hose connector protrusions to make a solid fluid tight seal. In many cases the force required to make such a connection requires the use of special tools or machinery.

Materials, both organic and metallic, capable of possessing shape memory are well known. An article made of such materials can be deformed from an original, high temperature configuration to a second, low temperature configuration. The article is said to have shape memory for the reason that, upon the application of heat alone, it can be caused to revert, or to attempt to revert, to its high temperature shape, from its low temperature configuration, i.e. it "remembers" is original, high temperature shape. The high temperature shape is imparted, that is, "memorized", during an operation known as shape setting, in which the material is constrained to the desired high temperature shape at elevated temperature and kept there for a finite amount of time. By forming the hose connector end of a shape memory alloy (SMA) material it becomes feasible to install the hose connector end by hand into a polymeric hose by deforming the hose connector end to a diameter smaller than the interior diameter of the polymeric hose. The connector end can then be heated to achieve transformation of the connector end to the memorized shape, thereby causing the hose connector to expand to its original shape and seal against the inner walls of the polymeric hose, thereby removing the need to use machinery or hand tools to install the hose connector on the polymeric hose.

SUMMARY

This disclosure relates to hose connector structure comprising a tubular pipe arranged for joining flexible hoses and having an insertion portion made of an SMA or other shape memory material that has a memorized shape. The insertion portion is located on one end of the tubular pipe and has an outer diameter smaller than an interior diameter of the flexible hose in a martensite state that allows the insertion portion to be inserted into the interior diameter of the flexible hose. The memorized shape is recovered with the application of heat, wherein the outer diameter of the insertion portion becomes larger than the outer diameter of the flexible hose sealing the outer diameter of the insertion portion against the interior diameter of the flexible hose.

In a second embodiment, a hose connector structure comprises, a joint pipe arranged for joining a pair of flexible hoses and having first and second insertion portions made of an SMA or other shape memory material that has a memorized shape. The insertion portions are located on first and a second ends of the joint pipe and each insertion portion having an outer diameter smaller than an interior diameter of the pair of flexible hoses in a martensite state that allows the insertion portion of the first end to be accepted into the interior diameter of a first flexible hose and the insertion portion of the second end to be accepted into the interior diameter of the second flexible hose. The memorized shape is recovered with the application of heat, wherein the outer diameter of the first and second insertion portions become larger than the outer diameter of the first and second flexible hoses sealing the outer diameter of each insertion portion against the interior diameter of its respective flexible hose.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIG. 1 is a side elevational view of a shape memory hose connecter in accordance to a first embodiment of the present disclosure;

FIG. 2 is a side sectional view of the shape memory hose connector of FIG. 1 having its insertion portion installed in a flexible polymeric hose after deforming the insertion portion, in a martensite state, in accordance to a first embodiment of the present disclosure;

DETAILED DESCRIPTION

Figure 3:
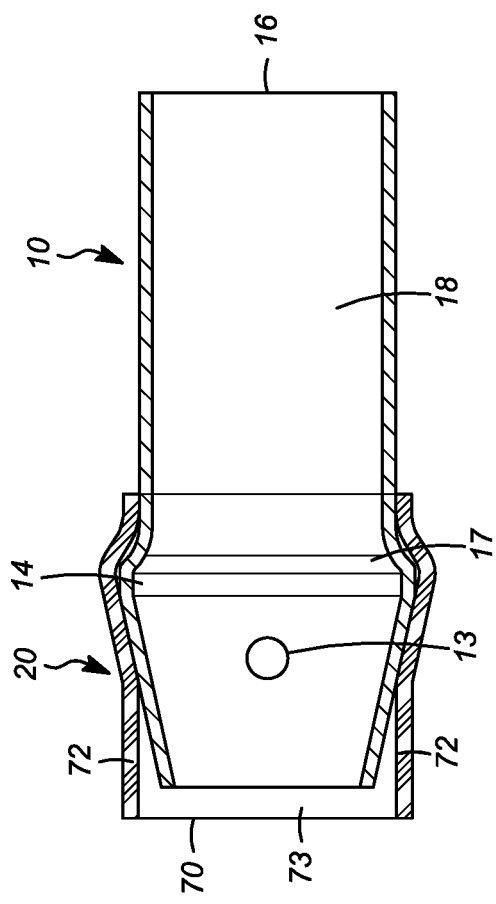
FIG. 3 is a side sectional view of the shape memory connector having the insertion portion shape memory recovered in accordance to the present invention.

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Among metallic alloys, the ability to possess shape memory is a result of the fact that the alloy undergoes a reversible solid-state phase transformation from an austenitic state to a martensitic state with a change in temperature. This transformation is sometimes referred to as a thermoelastic martensitic transformation. An article made from such a shape memory alloy (SMA), for example a wire, is easily deformed from its original high temperature or austenitic configuration to a new configuration when cooled below the temperature at which the alloy is transformed from the austenitic state to the martensitic state. The temperature at which this transformation begins is usually referred to as the $M_s$ temperature (the martensite start temperature), and upon continued cooling the temperature at which it finishes, the $M_f$ temperature (the martensite finish temperature). The wire changes from a rigid state with a relatively high yield strength, in its austenitic form, to a state in which it is easily deformable, with a relatively low yield strength, in its martensitic form, in which it is able to sustain significant plastic-like deformation, at an almost constant stress level, as the result of the realignment of crystallographic twins which formed during cooling from the austenitic to the martensitic state, in a process known as self-accommodation. When an article thus deformed is warmed to the temperature at which the alloy starts to revert back to austenite, referred to as the $A_s$ temperature (austenite start temperature), the deformed object will begin to return to its original configuration; with continued heating the object will reach a temperature referred to as the $A_f$ temperature (the austenite finish temperature), the temperature at which the reversion to the high temperature configuration is complete. Devices made from SMA material rely on the property of shape memory to achieve their desired effects. That is to say, they rely on the fact that when an SMA element is cooled to its martensitic state and is subsequently deformed, it will retain this deformed shape due to the fact that in this state it is able to easily sustain deformation. However, when it is heated to its austenitic state, the original high temperature austenitic shape will be recovered and the shape in the austenitic form will be relatively rigid and not easily deformable.

A hose connector of the disclosure is formed at the end of a rigid pipe body or tubing typically used to connect the pipe body to a flexible polymeric hose, such as the tubing used between a vehicle's fuel tank and engine carburetor or other fuel metering system. The pipe body can be part of along rigid fluid line or a stem defined at the end of a connector body. The polymeric hose is fitted on the outer periphery of the hose connector to form a fluid connection between the fluid line or connector body with the polymeric hose.

FIG. 1 shows a first embodiment in which a rigid pipe body 10 extends horizontally from a rear end 16 to an opening 11 at an annular frustoconical shaped insertion portion 20. The insertion portion 20 is made from an SMA material and extends outward from a tip 15 to a radially enlarged annular sealing surfaces 14. The sealing surfaces 14 include an annular face 17 that extends backwards at a constant diameter from the frustoconical front end 20 towards the pipe body rear end 16. Therefore, in its normal shape memory state the insertion portion 20 takes the form of a barbed end whose sealing surfaces have a diameter greater than the exterior diameter of a flexible hose 70. As can be best seen at FIG. 3, a flexible hose 70 made of polyamide resin, fluoroplastics, olefin resin, and so on, has an inside diameter that is less than the outside diameter of sealing surfaces 14. Therefore, when the insertion portion 20 is installed into flexible hose 70 and its shape memory recovered, the insertion portion 20 expands to its shape memory diameter. The recovery of insertion portion 20 expands the outer diameter of flexible hose 70 to a diameter greater than the diameter that the flexible hose had before recovery of the insertion portion shape memory. This allows sealing surfaces 14 to make a liquid tight seal with interior surfaces 72 of flexible hose 70 forming a tight hermetic closure between sealing surfaces 14 and the interior surfaces 72.

As explained earlier, in order to easily insert the insertion portion 20 into flexible hose 70, for example by hand, the insertion portion is deformed into a diameter less than the interior diameter defined by interior walls 72 of flexible hose 70. SMA materials are easily deformed from their original high temperature or austenitic configuration to a new configuration when cooled below the temperature at which the alloy is transformed from the austenitic state to the martensitic state. The article changes from a rigid state with a relatively high yield strength, in its austenitic form, to a state in which it is easily deformable, with a relatively low yield strength, in its martensitic form. Typically, in the martensitic form the SMA material is able to sustain significant plastic-like deformation, for example, to a diameter which is 30 percent less than its original shape, at an almost constant stress level.

As can be seen in FIG. 2, the insertion portion 20 including sealing surfaces 14 and annular face 17 are mechanically deformed in a martensitic state to an annular diameter that is less than or equal to the interior diameter 73 of flexible hose 70. The deformation is made when the SMA material is in its martensitic form by, for example, a first hand tool that crushes or deforms the insertion portion 20 into an annular taper and diameter required to easily insert the insertion portion into the interior diameter 73 of the flexible hose 70 or, by a second hand tool that uses a metal rod (not shown) that is inserted into a hole 13 made on each side of insertion portion 20 near surface 14. The rod of the second hand tool can be used to impart a pulling force on insertion portion 20 that elongates and narrows the insertion portion 20 to a diameter required to be easily inserted into interior diameter 73 of flexible hose 70. Alternately, the insertion portion 20 can be deformed, for example, by a machining die during a manufacturing process. With the insertion portion deformed, it can be easily inserted by hand into the interior diameter 73 of flexible hose 70 between interior walls 72.

Once the insertion portion is inserted into flexible hose 70, heat energy can be applied to the insertion portion 20, using for example, devices that can direct thermal energy in the form of hot air or radiant heat energy, such as a heat gun. The heat energy can also be applied indirectly to the insertion portion, for example, by directing the heat to the tube body 10 which is transferred by conduction to the insertion portion 20. As the insertion portion 20 is warmed to the temperature at which the alloy starts to revert back to austenite, referred to as the $A_s$ temperature, the deformed insertion portion 20 will begin to return to its original shape. With continued heating the insertion portion 20 will reach the $A_f$ temperature, which is the temperature at which the original shape is recovered.

As can be best seen at FIG. 3, upon recovery of insertion portion 20 insertion portion 20 expands to a diameter approximately 30 percent greater than the diameter the insertion portion had in its martensitic state. The recovery of the insertion portion acts on the inner walls 72 to expand the outer diameter of flexible tube 70 to a diameter greater than the diameter that the flexible hose 70 had before assembly of the insertion portion 20. This expansion allows sealing surfaces 14 to make a liquid tight seal with interior surfaces 72 forming a tight hermetic closure between sealing surfaces 14 and interior surfaces 72 of the flexible hose 70, forming a fluid tight passage for fluids to flow between interior 18 of pipe body 10 to the interior 73 of flexible hose 70.

Figure 4:
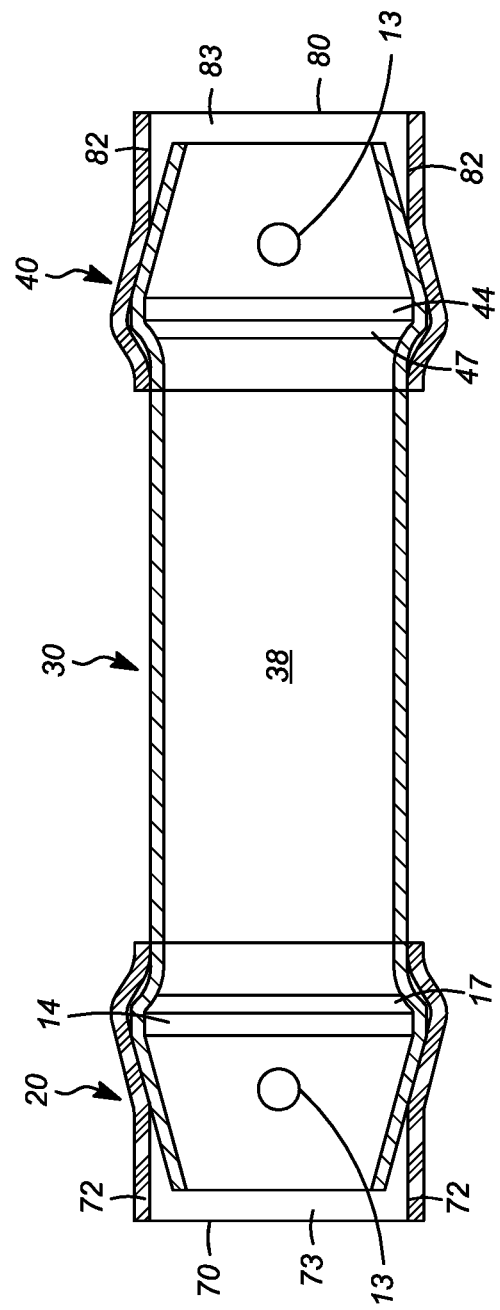
FIG. 4 is a side sectional view of as shape memory connector having insertion portions on two ends connecting two flexible polymeric hoses together in accordance to a second embodiment of the present invention.

FIG. 4 illustrates a second embodiment of the present disclosure that provides a joint pipe body for coupling a pair of flexible hoses together. In this second embodiment a rigid joint pipe body 30 includes a first annular frustoconical shaped insertion portion 20 on a first end of the joint pipe body 30 and a second annular frustoconical shaped insertion portion 40 extending from a second end of the pipe body 30. The insertion portions 20 and 40 are identical in construction with each having a respective sealing surface 14 and 44 and annular face 17, 47 respectively. Each insertion portion 20, 40 is made from an SMA material. Therefore, in its normal shape memory state the first insertion portion 20 and the second insertion portion 40 take the form of a barbed end whose sealing surfaces have a diameter greater than the exterior diameter of a respective first flexible hose 70 and a second flexible hose 80. As explained earlier and seen in FIG. 2, insertion portion 20, including sealing surfaces 14 and annular face 17 are mechanically deformed in a martensitic state to an annular diameter that is less than or equal to the interior diameter 73 of flexible hose 70. Similarly, insertion portion 40, including sealing surfaces 44 and annular face 47 are mechanically deformed in a martensitic state to an annular diameter that is less than or equal to the interior diameter 83 of flexible hose 80. The deformation is made when the SMA material is in its martensitic form by, for example, a had tool that crushes or deforms the insertion portion into an annular taper and diameter required to easily insert the insertion portion into the interior diameter 73, 83 of respective flexible hoses 70, 80.

Once the insertion portions are inserted into flexible hoses 70, 80 heat energy can be applied to each insertion portion, using for example, devices that can direct thermal energy in the form of hot air or radiant heat energy, such as a heat gun. The heat energy can also be applied indirectly to the insertion portion, for example, by directing the heat to the joint pipe body 30 which is transferred by conduction to the insertion portions. As the insertion portions 20, 40 are warmed to the temperature at which the alloy starts to revert back to austenite, referred to as the $A_s$ temperature, the deformed insertion portions 20, 40 will begin to return to their original shape. With continued heating the insertion portions 20, 40 will reach the austenite finish temperature $A_f$, which is the temperature at which the original shape is recovered.

As can be best seen at FIG. 4, upon recovery of insertion portions 20, each insertion portion 20, 40 expands to a diameter approximately 30 percent greater than the diameter the insertion portion had in its martensitic state. The recovery of the insertion portion acts on respective inner walls 72, 82 to expand the outer diameter of each flexible tube 70, 80 to a diameter greater than the diameter that the pair of flexible hoses 70, 80 had before assembly with their respective insertion portions. The shape memory recovery allows for sealing surfaces 14 to make a liquid tight seal with interior surfaces 72 forming a tight hermetic closure between sealing surfaces 14 and interior surfaces 72 of the flexible hose 70. Similarly, the shape memory recovery allows sealing surfaces 44 to make a liquid tight seal with interior surfaces 82 forming a tight hermetic closure between sealing surfaces 44 and interior surfaces 82 of the flexible hose 80. This forms a fluid tight passage between the interior diameter 83 of flexible hose 80, the interior 18 of pipe body 10 to the interior 73 of flexible hose 70 coupling the pair of flexible hoses to each other.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "vessel," or "system," within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A hose connector structure comprising: a tubular pipe having an insertion portion made of a shape memory alloy that has a memorized shape; a flexible hose having an interior diameter defined by an interior wall and an outer diameter defined by the interior diameter; the insertion portion located on one end of the tubular pipe having an outer diameter smaller than the interior diameter of the flexible hose in a martensitic state that allows the insertion portion to be inserted into the interior diameter of the flexible hose; and recovering the memorized shape of the insertion portion to the austenitic state with the application of heat, wherein the outer diameter of the insertion portion acts on the interior wall of the hose to expand the outer diameter of the flexible hose to a diameter greater than the diameter that the hose had prior to assembly with the insertion portion, so as to form a hermetic closure between the insertion portion and the hose.

2. The hose connector structure according to claim 1, wherein the insertion portion in the martensitic state is mechanically deformed to reduce the outer diameter of the insertion portion to a diameter smaller than the inner diameter of the flexible hose.

3. The hose connector structure according to claim 2, wherein the insertion portion comprises a frustoconical head having outer annular sealing surfaces having a diameter greater than the outer diameter of the flexible hose, the sealing surfaces deformable to reduce their outer diameter in the martensitic state and to fully recover the annular diameter of the sealing surfaces in the austenitic state when heated.

4. The hose connector structure according to claim 3, wherein the frustoconical head sealing surfaces when expanded in the austenitic state force the interior and outer diameter of the flexible hose where it contacts the sealing surfaces to a diameter greater than the diameter before the sealing surfaces are expanded and making a seal between the sealing surfaces and the flexible hose.

5. The hose connector structure according to claim 3, wherein the sealing surfaces are deformed using a hand tool.

6. The hose connector structure according to claim 3, wherein the sealing surfaces are deformed using a die during a manufacturing process.

7. A hose connector structure comprising: a joint pipe having first and second insertion portions made of a shape memory alloy that have a memorized shape; first and second flexible hoses each having an interior diameter defined by an interior wall and an outer diameter defined by the interior diameter; the insertion portions located on a first and a second end of the joint pipe and each insertion portion having an outer diameter smaller than an the interior diameter of each of the pair of first and second flexible hoses in a martensitic state that allows the insertion portion of the first end to be accepted into the interior diameter of the first flexible hose and the insertion portion of the second end to be accepted into the interior diameter of the second flexible hose; recovering the memorized shape of the first and second insertion portions to the austenitic state with the application of heat, wherein the outer diameter of each of the first and second insertion portions act on the interior wall of its respective first and second flexible hose to expand the outer diameter of each of the first and second flexible hoses to a diameter greater than the diameter that each hose had prior to assembly with its respective insertion portion, so as to form a hermetic closure between each insertion portion with its respective first and second flexible hose.

8. The hose connector structure according to claim 7, wherein each of the first and second the insertion portions in the martensitic state is mechanically deformed to reduce the outer diameter of each insertion portion to a diameter smaller than the inner diameter of the flexible hose.

9. The hose connector structure according to claim 8, wherein each of the first and second insertion portions comprise a frustoconical head having outer annular sealing surfaces the annular sealing surfaces having a diameter greater than the outer diameter of the pair flexible hoses, the sealing surfaces deformable to reduce their outer diameter in the martensitic state and to fully recover their annular diameter of the sealing surfaces in the austenitic state when heated.

10. The hose connector structure according to claim 9, wherein the each of the first and second sealing surfaces when expanded in the austenitic state force the inner and outer diameter of a respective first and second flexible hose where it contacts the sealing surfaces to a diameter greater than the diameter before the sealing surfaces are expanded, making a seal between the sealing surfaces and the flexible hose.

11. The hose connector structure according to claim 9, wherein the sealing surfaces are deformed using a hand tool.

12. The hose connector structure according to claim 9, wherein the sealing surfaces are deformed using a die during a manufacturing process.

13. A method for connecting a flexible hose having an interior diameter defined by an interior wall and an outer diameter defined by the interior diameter to a hose connector, the method comprising: constructing a tubular insertion portion on at least one end of the hose connector from a shape memory alloy that has a memorized shape; deforming the insertion portion to an outer diameter smaller than an interior diameter of the flexible hose; inserting the insertion portion into the interior diameter of the flexible hose; and applying heat to recover the memorized shape causing the outer diameter of the insertion portion to act against the interior wall of the hose to expand the outer diameter of the flexible hose to a diameter greater than the diameter that the hose had prior to assembly with the insertion portion, so as to form a hermetic closure between the insertion portion and the hose.

14. The method according to claim 13, wherein the insertion portion is mechanically deformed in the martensitic state.

15. The method according to claim 13, wherein the insertion portion comprises a frustoconical head having outer annular sealing surfaces of a diameter greater than the outer diameter of the flexible hose, wherein the sealing surfaces are deformed to reduce their outer diameter smaller than an interior diameter of the flexible hose and to fully recover the annular diameter of the sealing surfaces when heated.

16. The method according to claim 15, wherein the frustoconical head sealing surfaces when expanded in the austenitic state force the interior and outer diameter of the flexible hose where it contacts the sealing surfaces to a diameter greater than the diameter before the sealing surfaces are expanded and making a seal between the sealing surfaces and the flexible hose.

17. The method according to claim 13, wherein the method further includes: deforming a second tubular insertion portion constructed on a second end of the hose connector from a shape memory alloy that has a memorized shape to an outer diameter smaller than an interior diameter of a second flexible hose; inserting the second insertion portion into an end of the second flexible hose; and applying heat to the second insertion portion to recover the memorized shape, causing the outer diameter of the second insertion portion to act against the interior wall of the second hose to expand the outer diameter of the second hose to a diameter greater than the diameter that the hose had prior to assembly with the second insertion portion, so as to form a hermetic closure between the second insertion portion and the second hose.

* * * * *